(12) United States Patent
Cheng et al.

(10) Patent No.: US 8,103,668 B2
(45) Date of Patent: Jan. 24, 2012

(54) SEARCH CONTROL AND AUTHORING ENVIRONMENT

(75) Inventors: Lili Cheng, Bellevue, WA (US); Stacey Harris, Redmond, WA (US); Andrzej Turski, Redmond, WA (US); Matthew Maclaurin, Woodinville, WA (US); Shane F Williams, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 589 days.

(21) Appl. No.: 11/952,228

(22) Filed: Dec. 7, 2007

(65) Prior Publication Data
US 2009/0150347 A1 Jun. 11, 2009

(51) Int. Cl.
*G06F 7/00* (2006.01)
(52) U.S. Cl. .......................................... 707/733; 707/783
(58) Field of Classification Search .................. None
See application file for complete search history.

(56) References Cited

U.S. PATENT DOCUMENTS

| | | | |
|---|---|---|---|
| 6,453,312 | B1 | 9/2002 | Goiffon et al. |
| 6,925,608 | B1 | 8/2005 | Neale et al. |
| 7,003,506 | B1 * | 2/2006 | Fisk et al. ............... 707/693 |
| 7,693,902 | B2 * | 4/2010 | Kim et al. ............... 707/731 |
| 2002/0138474 | A1 * | 9/2002 | Lee ............................. 707/3 |
| 2005/0086207 | A1 * | 4/2005 | Heuer et al. ................. 707/3 |
| 2005/0108681 | A1 | 5/2005 | Bent et al. |
| 2006/0020445 | A1 | 1/2006 | Bodin et al. |
| 2006/0026033 | A1 * | 2/2006 | Brydon et al. ................. 705/1 |
| 2007/0022125 | A1 * | 1/2007 | Salam et al. ............... 707/100 |
| 2007/0027851 | A1 * | 2/2007 | Kruy et al. ................... 707/3 |
| 2007/0038601 | A1 * | 2/2007 | Guha ........................... 707/3 |
| 2007/0055935 | A1 * | 3/2007 | Busey ....................... 715/700 |
| 2007/0061742 | A1 | 3/2007 | Brooks et al. |
| 2007/0106951 | A1 | 5/2007 | McCormack et al. |
| 2007/0112781 | A1 * | 5/2007 | McMullen et al. ........... 707/10 |
| 2007/0219964 | A1 * | 9/2007 | Cannon et al. ............... 707/3 |
| 2007/0233685 | A1 * | 10/2007 | Burns et al. ................. 707/9 |
| 2007/0250492 | A1 * | 10/2007 | Angel et al. ................. 707/4 |
| 2008/0115228 | A1 * | 5/2008 | Martinez et al. ............ 726/30 |
| 2008/0168052 | A1 * | 7/2008 | Ott et al. ..................... 707/5 |
| 2008/0208808 | A1 * | 8/2008 | Sue et al. ..................... 707/3 |
| 2008/0244429 | A1 * | 10/2008 | Stading ...................... 715/764 |
| 2008/0301570 | A1 * | 12/2008 | Milstead et al. ............ 715/763 |
| 2008/0306954 | A1 * | 12/2008 | Hornqvist ................... 707/9 |
| 2009/0007274 | A1 * | 1/2009 | Martinez et al. ............ 726/27 |
| 2009/0089652 | A1 * | 4/2009 | Chi et al. .................. 715/205 |
| 2009/0100015 | A1 * | 4/2009 | Golan ........................ 707/3 |
| 2009/0119280 | A1 * | 5/2009 | Waters et al. ................. 707/5 |

OTHER PUBLICATIONS

"Community Manager—3rd Quarter Release".
Petropoulos, et al., "Building XML Query Forms and Reports with XQForms", Computer Networks, vol. 39 Issue: 5, 2002.

\* cited by examiner

*Primary Examiner* — Vei-Chung Liang

(57) ABSTRACT

A technique for adding a search control by a user to a file, webpage, desktop, or mobile device, for example. The control lets the end user create documents, webpages, or dashboards with static and/or dynamic content as easily as inserting pictures. The technique also facilitates the imbedding of control access to the search information via this control. When a document is created, the control allows for adding a search into the document, authoring the default view of the query (e.g., thumbnail, details, extended view, slideshow, timeline, etc.), setting the scope (e.g., local computer, website, company human resources database, etc.), and "publishing" states (e.g., dynamically update, static-fixed, query run on local machine, etc). The technique also facilitates the adding of views such as via a user interface control for "adding a search" and standard "search list view control."

20 Claims, 18 Drawing Sheets

SEARCH CONTROL AND AUTHORING ENVIRONMENT

BACKGROUND

There is an enormous amount of information being created, gathered, and stored on networks and computing systems. Moreover, the evolving nature of the networks, for example, means there is an equally evolving and changing set of data being created and deleted. Thus, a search at any point in time becomes a snapshot of the data. Searches on local systems can be a more stable and fixed set since the data typically changes less frequently. However, in both cases, the ability to not only obtain the same set of results and/or but also maintain the same query over time can be problematic. Additionally, it can be desirable to maintain the query and search results in a more focused context such as a document. This can then become the vehicle for sharing queries and search results.

There are many search providers and searches are becoming increasingly important as a means for obtaining general sets of related information from the billions of potential documents that can be available for the search on the Internet or network, and the large number of files being stored on local computing systems. Additionally, people are also beginning to think about aggregated searches that combine different queries from different data sources.

There is no way to maintain or "hardwire" a query or multiple queries to a file or page. This includes the creation of the query, as well as maintaining the query over the lifecycle of the file it is contained within.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed technique allows a standard search control to be added by a user to a file, webpage, desktop, or mobile device, for example. The control lets the end user create documents, webpages, or dashboards with static and/or dynamic content as easily as inserting pictures. The technique also facilitates the imbedding of control access to the search information via this control.

For example, when a document is created, the control allows for adding a search into the document, authoring the default view of the query (e.g., thumbnail, details, extended view, slideshow, timeline, etc.), setting the scope (e.g., local computer, website, company human resources database, etc.), and "publishing" states (e.g., dynamically update, static-fixed, query run on local machine, etc). The technique also facilitates the adding of views such as via a user interface control for "adding a search" and standard "search list view control."

Once a query is in the document (e.g., embedding a query "documents about project XYZ from my computer", the user can set permissions on the file such that the permissions carry through to the set of items included in the query and will be made accessible to the end user. One of the permission settings can be "request access" or perform other action, or the setting may be to "automatically grant access."

In other words, the end user can author a search in a file or document. A single search control or multiple controls can be added into a document, each control associated with a different view, a different source, and a different query, all illustrated on the same page or different pages. Templates and default views can be provided for viewing different types of information. Additionally, developers can add the control to applications and/or services.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

DETAILED DESCRIPTION

Figure 1:
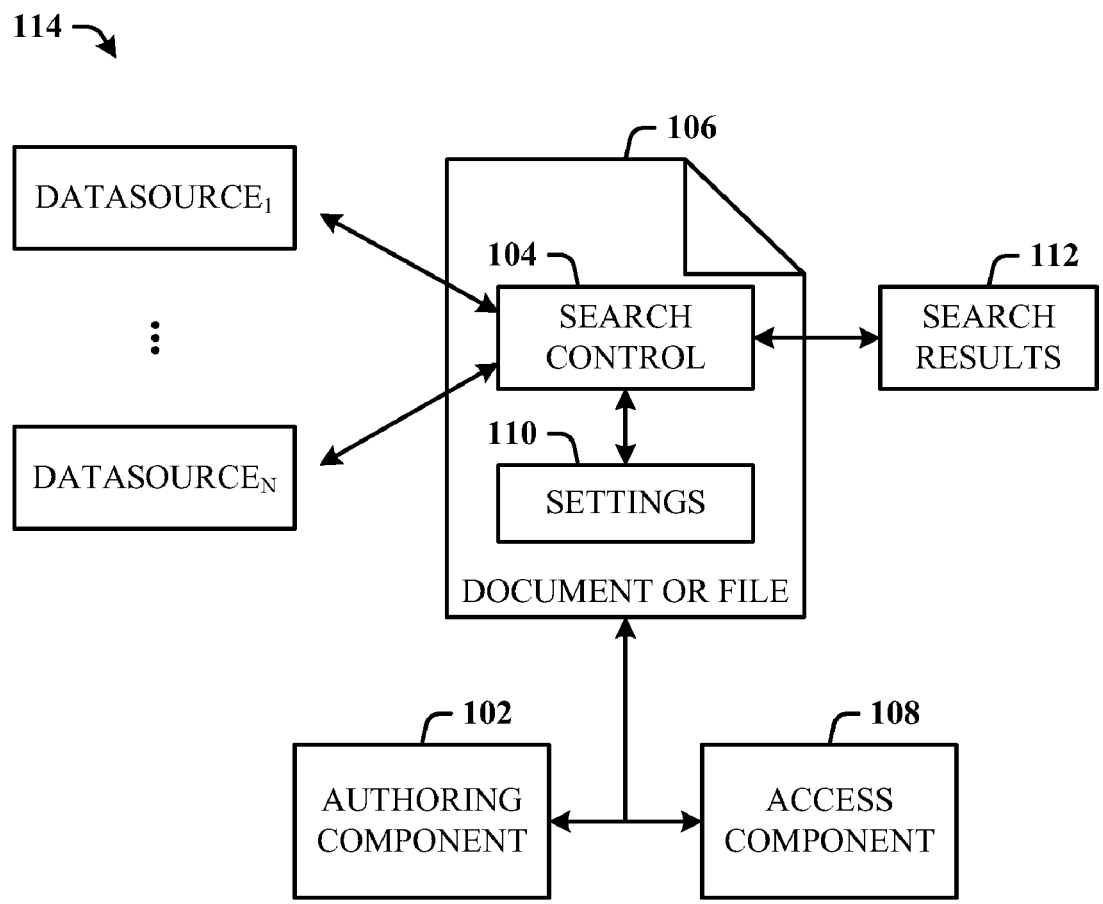
FIG. 1 illustrates a computer-implemented system for managing data.

The disclosed architecture facilitates the authoring and embedding of a search and search result in a document. The search and result will stay with the document over the lifetime of the document. Thus, information can be passed across similar or different computing platforms as well as for access by the same or different users. Additionally, the ways in which the search and search results are presented to the end user can be controlled by the author.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

FIG. 1 illustrates a computer-implemented system 100 for managing data. The system 100 includes an authoring component 102 for creating and inserting a search control 104 into a document (or file) 106 and saving the search control 104 with the document 106. An access component 108 is provided for managing access to and settings (or control parameters) 110 of the search control 104 over lifetime of the document 106. The authoring component 102, in one aspect thereof, facilitates assigning a publishing state to the search control which initiates automatic execution of the search control when the document is opened.

The search control 104 can be associated with a search query that is executed and returns search results 112. The search control 104 and the search results 112 follow the document 106 for the lifetime of the document 106. The search control 104 and/or the search results 112 (e.g., multimedia data types) can then be presented when the document 106 is opened for viewing, for example. The settings 110 associated with the search control 104 facilitate the configuration or setting of alternate views and view selection mechanisms when the document 106 is opened and the search control 104 and/or search results 112 are exposed for presentation (viewing).

Moreover, the search control 104 can define a default view when accessed. In other words, when the document 106 is opened (e.g., on another machine, by a different user, in a different application, etc.) and the search control and search results are viewed, the view presented for all search results 112 can be set and fixed using the settings 110. Alternatively and according to more granular control, it may be that one view is preferred when presenting image files, and another view is preferred when presenting text files, and so on.

In yet another example, the settings 110 can be according to the application in which the document 106 is accessed (or opened). For example, in a light-weight (e.g., plain text) document application, the document 106 can be opened and the view presented in a less computationally intensive way (e.g., simple list), in contrast to a more robust word processing application where the view may be an extended details view or a thumbnail view. In still another example, the settings can take into account the system on which the document is being processed. For example, the view can be adjusted differently for a handheld device than a desktop computer. Other aspects of the disclosed architecture are described below.

The search control 104 and associate settings 110 can be configured to set the scope for one or more datasources 114, such as a private datasources (e.g., personal computer), a corporate datasource (e.g., human resources, email server, etc.), and/or web properties (e.g., websites, web searches, etc.).

The disclosed search control technique allows the end user to create documents, web pages, and/or dashboards with dynamic content as easily as inserting pictures. In other words, the settings can be such that when the user opens the file or document 106, the search control re-executes the search and returns a new set of search results for access.

Figure 2:
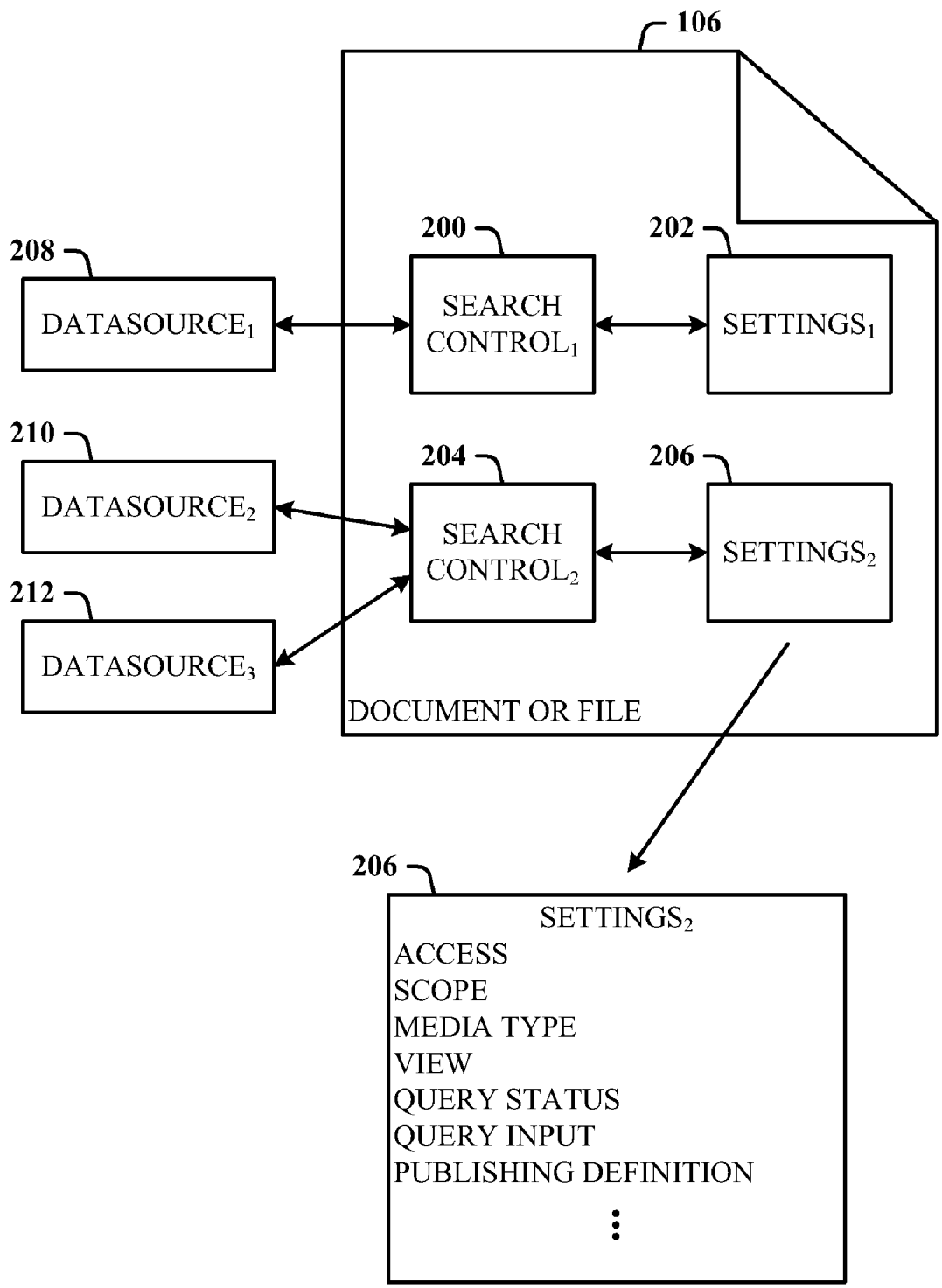
FIG. 2 illustrates alternative implementation of multiple search controls in the document or file.

FIG. 2 illustrates alternative implementation of multiple search controls in the document or file 106. Here, the document or file 106 includes a first search control 200 and associated first settings 202, and a second search control 204 and associated second settings 206. Additionally, the scope of the first search control 200 is to a single datasource 208, and the scope of the second search control 204 is for two datasources (210 and 212). The second settings 206 are expanded out to indicate the types of settings that can be employed and accessed via the search control 204. For example, the settings 206 can be associated with access permissions, scope (datasources), media type (e.g., image, video, audio, text, etc.), view (e.g., thumbnail, details, extended details, stacked, timeline view, slideshow, etc.), query status (e.g., already executed, re-executed, in-process, errors, date, time, items returned, etc.), query input (e.g., search terms), publishing definition(s) (e.g., static, dynamic), and so on. Thus, the author can add a search control into a document, and also add multiple controls with different views, different sources, and different queries, all showing together on a single page.

Figure 3:
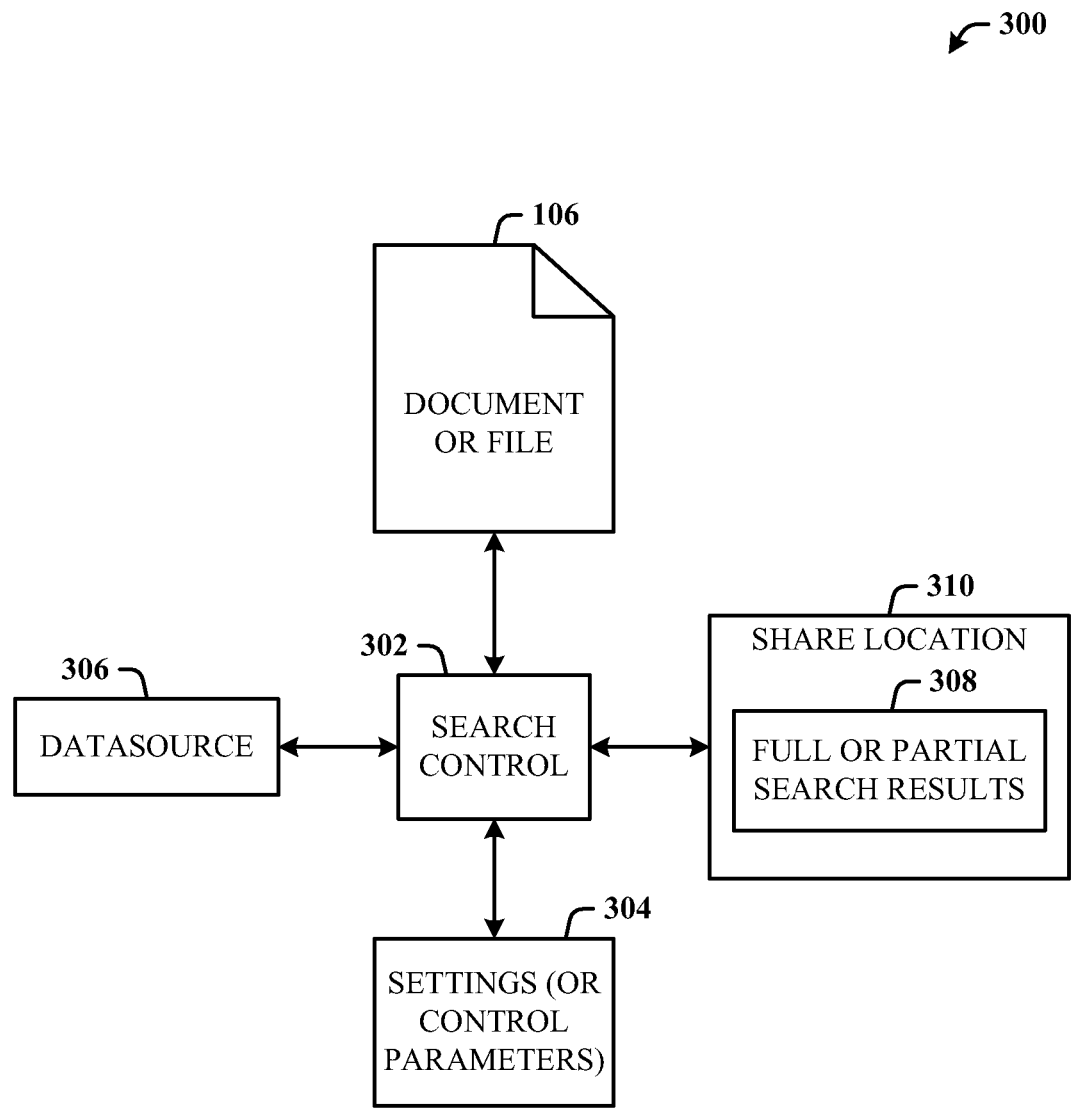
FIG. 3 illustrates a system for the uploading of search results to an accessible share location based on user access restrictions.

FIG. 3 illustrates a system 300 for the uploading of search results to an accessible share location based on user access restrictions. Here, the document (or file) 106 has associated therewith a search control 302 and settings or control parameters 304 that define parameters such as a datasource 306 to perform the search against, and results (partial or full) 308 of which are uploaded to a share location 310 for access by a user. In other words, an authored document can be passed to different systems and/or different users for interaction. Moreover, the datasource 306 can be of a system (e.g., personal computer) that may contain sensitive or personal data to which the system user desires to restrict access. If the user opening the document (or file) does not have uninterrupted access to the datasource 306, the settings components 304 of search control 302 will move all or some of the results 308 to a share location 310 and apply security rights to items in the search result(s). The share location 310 can be local to the user machine or a network location (e.g., website, network share, etc.), for example.

Other aspects that will be described in greater detail include the capability to a change of view (e.g., extended details, thumbnail, etc.) after the document has been accessed via the search control and control parameters. There are a range of views available and the author can set a default view which is shown when the document is opened. Templates and default views are provided for viewing different types of content. In many cases the viewer can change the view to see the results displayed in a different way. Additionally, the search control defines access to search parameters of the search control and results of the search associated with the search control. The search control can be edited to add a scope (e.g., datasource) and change an existing scope. The access can also be managed by limiting access to content associated with the search control. Developers can also add the search control to an application or service.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
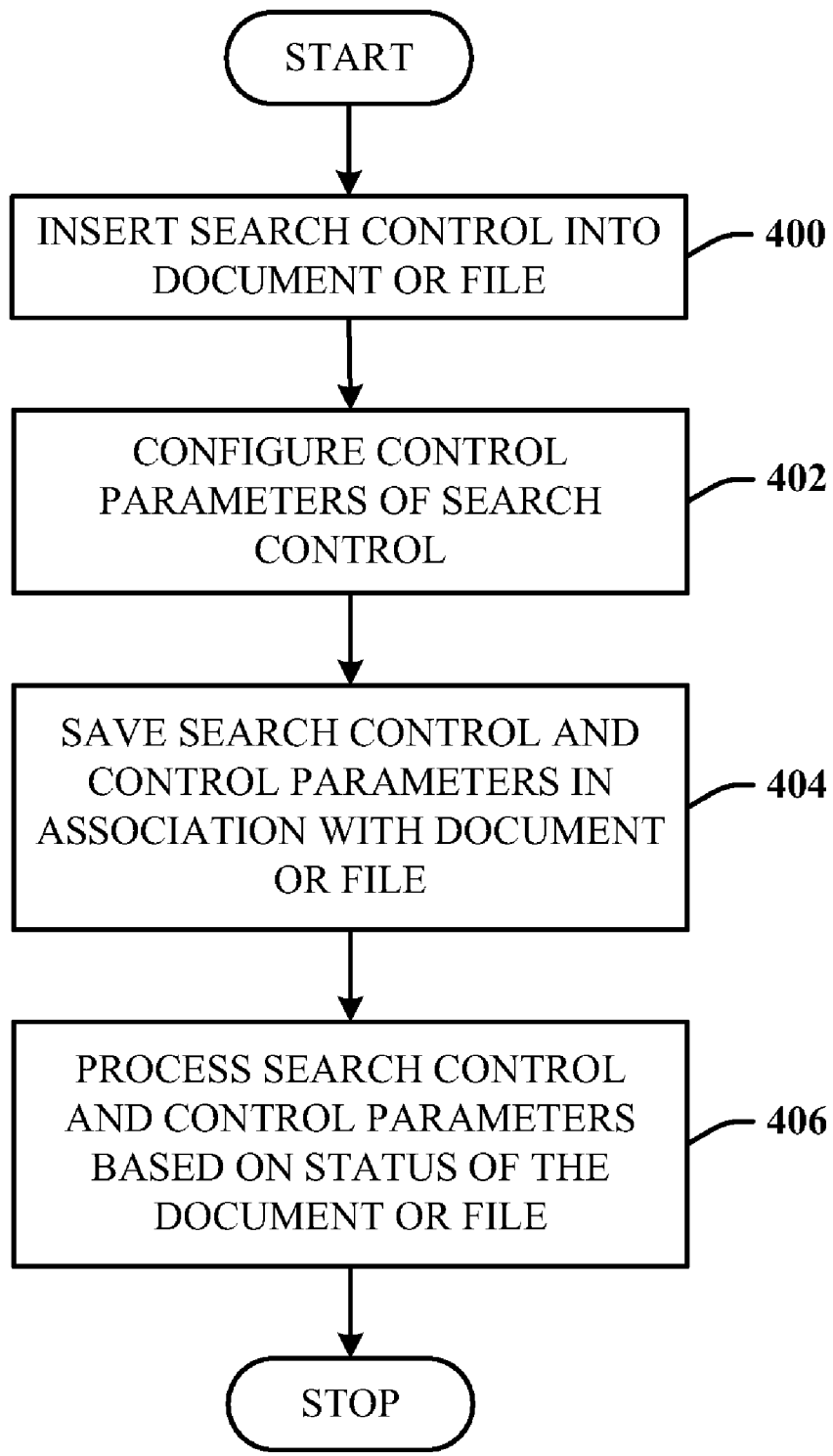
FIG. 4 illustrates a computer-implemented method of managing data associated with a document.

FIG. 4 illustrates a computer-implemented method of managing data associated with a document. At 400, a search control is inserted into a document. At 402, control parameters of the search control are configured. At 404, the search control and the control parameters are saved in association with the document. At 406, the search control and control parameters are processed based on status of the document.

Figure 5:
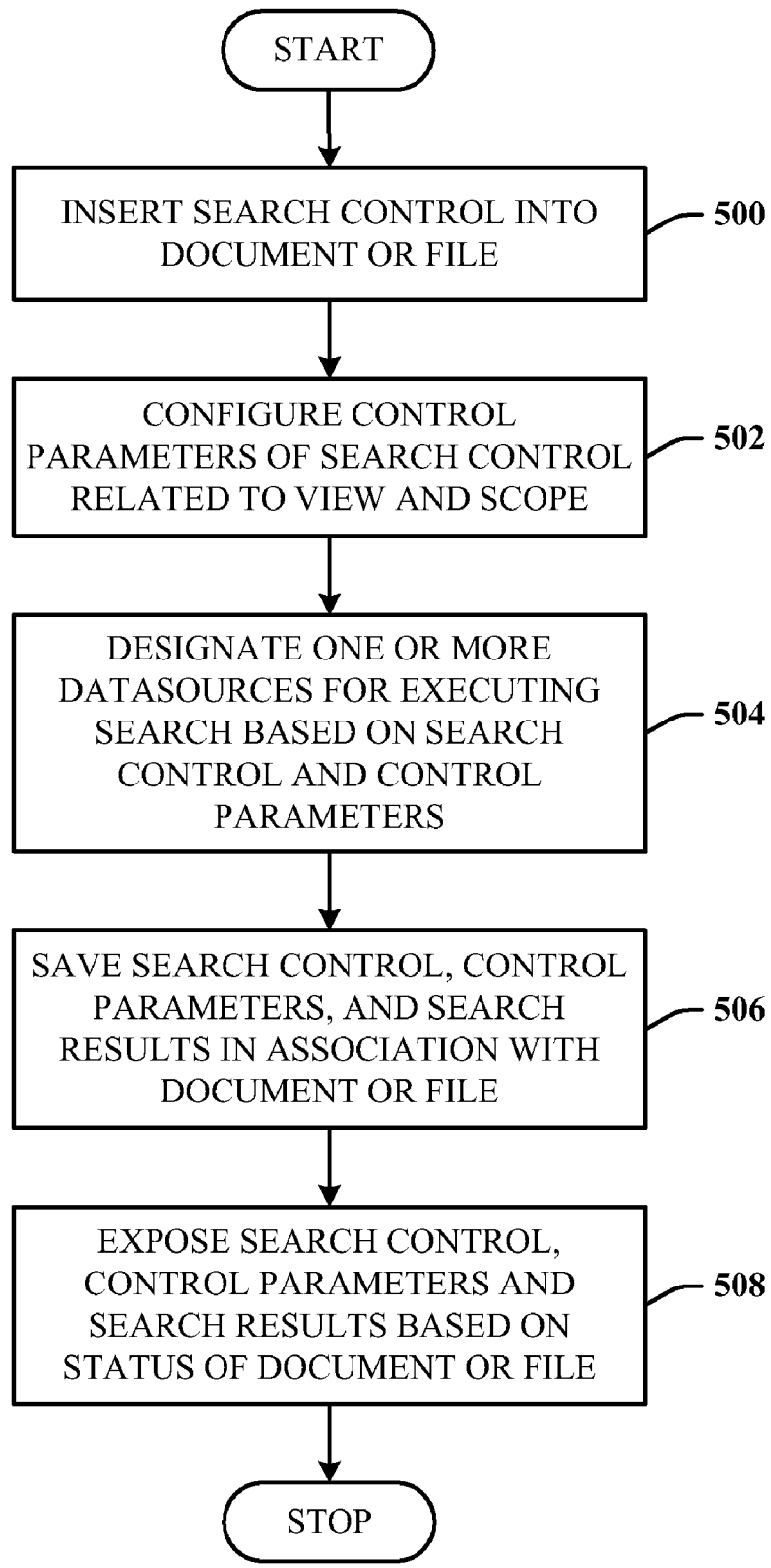
FIG. 5 illustrates an alternative computer-implemented method of managing data associated with a document.

FIG. 5 illustrates an alternative computer-implemented method of managing data associated with a document. At 500, a search control is inserted into a document. At 502, control parameters of the search control related to view and scope are configured. At 504, one or more datasources are designated for executing a search based on the search control and control parameters. At 506, the search control, the control parameters, and search results are saved in association with the document. At 508, the search control, control parameters, and search results are exposed based on status of the document (e.g., the document being opened).

Figure 6:
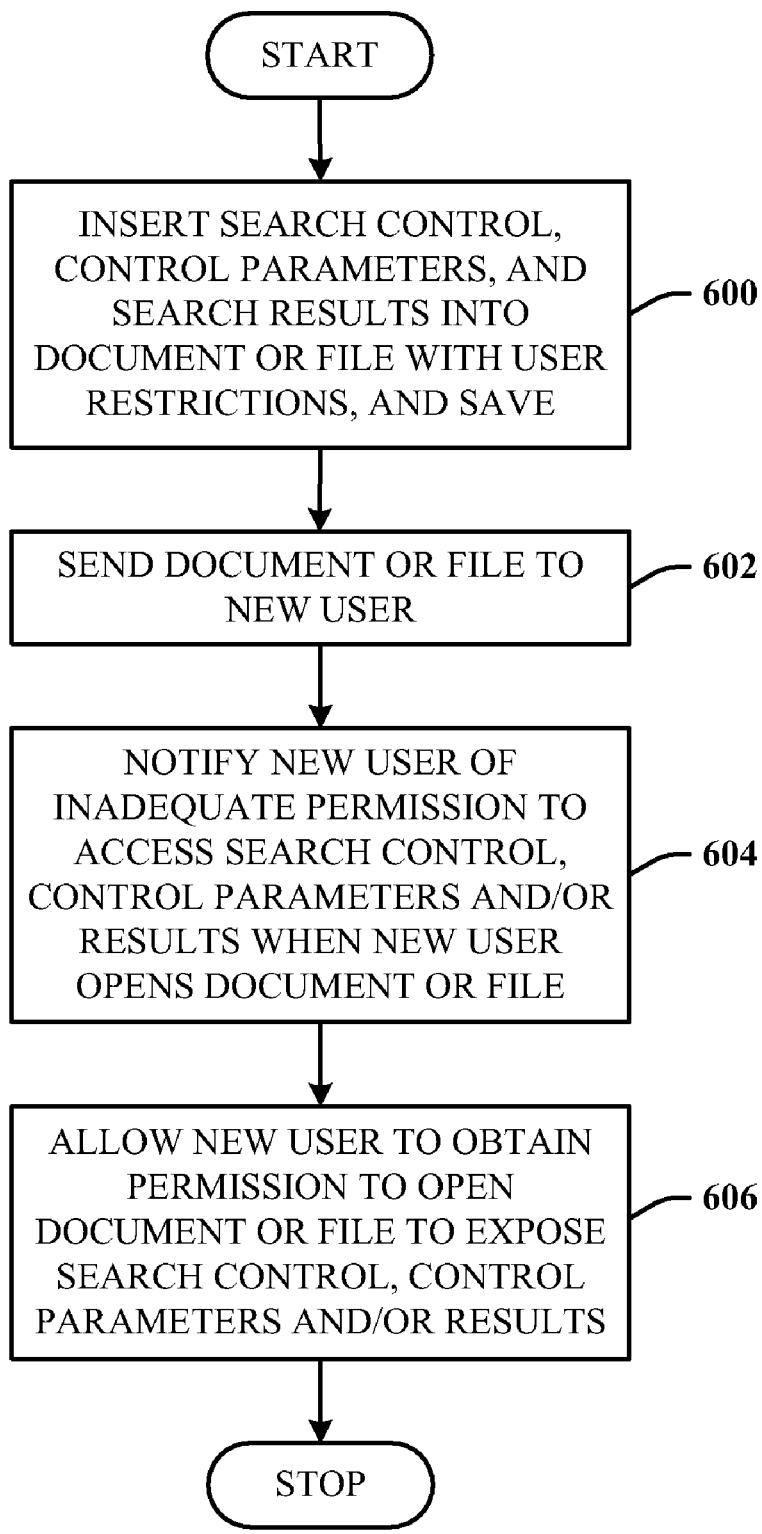
FIG. 6 illustrates a method of managing user-level permission to a search control, control parameters, and/or search results.

FIG. 6 illustrates a method of managing user-level permission to a search control, control parameters, and/or search results. At 600, a search control, control parameters, and search results are inserted into document or file with user restrictions, and saved with the document or file. At 602, the document or file is sent to new user. At 604, the new user is notified of inadequate permission to access the search control, control parameters, and/or results when the new user opens document or file. At 606, the new user is allowed to obtain permission to open document or file to expose the search control, control parameters, and/or results.

Figure 7:
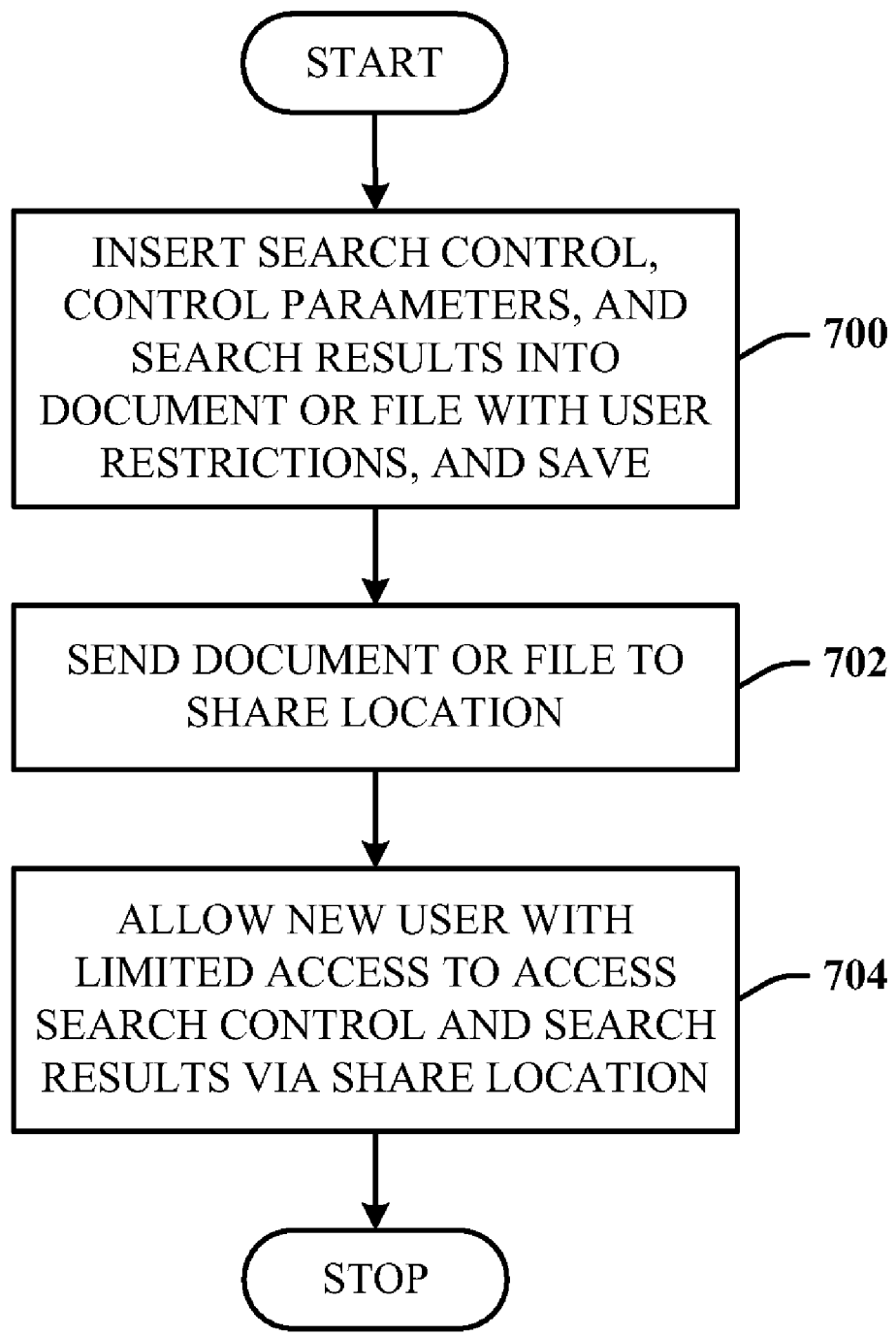
FIG. 7 illustrates a method of managing access to search control information using a share location.

FIG. 7 illustrates a method of managing access to search control information using a share location. At 700, the search control, control parameters, and search results are inserted into a document or file. At 702, the document or file is sent to a share location. At 704, a new user with limited access to the author machine is now allowed to access the search control and search results via the share location.

Figure 8:
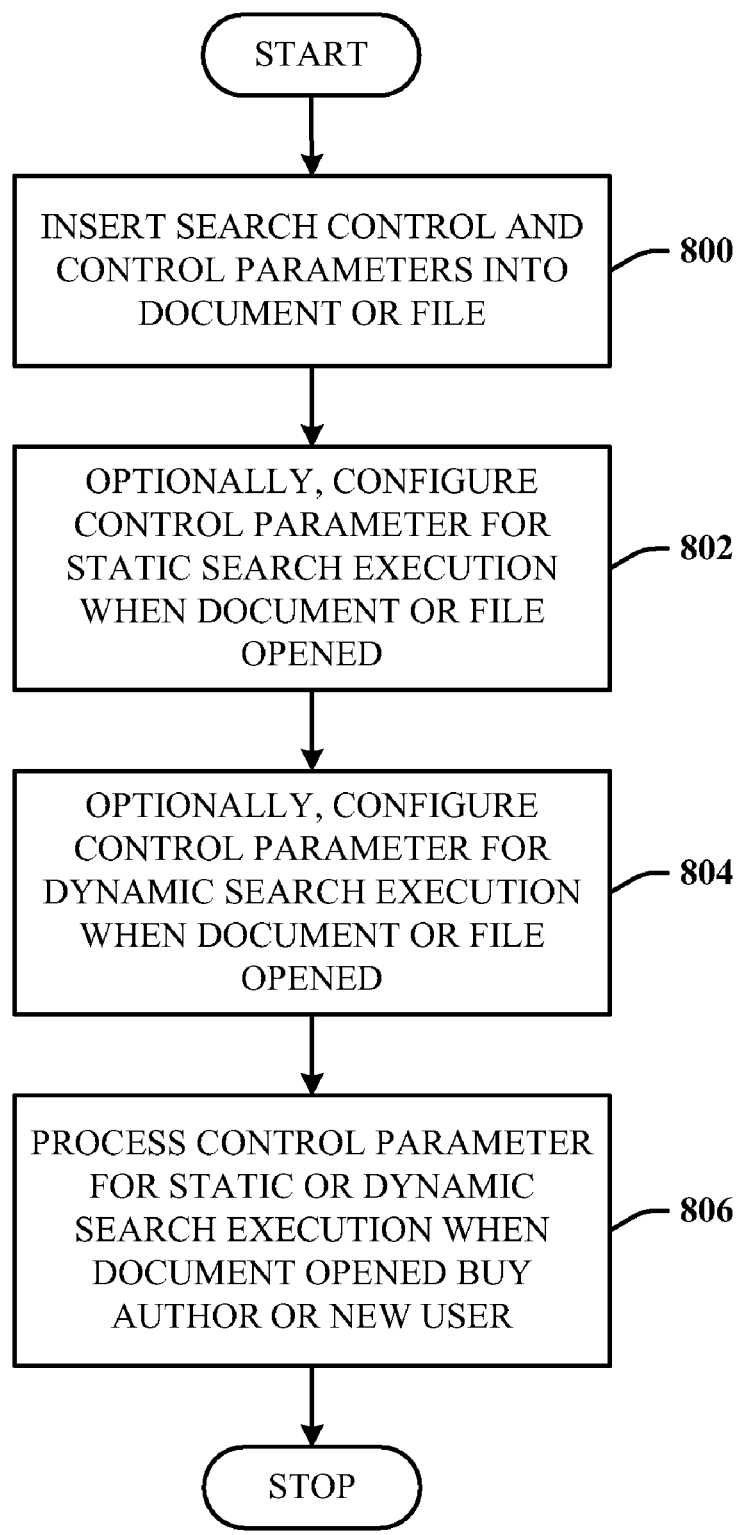
FIG. 8 illustrates a method of controlling search execution in the document or file when the document is opened.

FIG. 8 illustrates a method of controlling search execution in the document or file when the document is opened. At 800, the search control and control parameters are inserted into the document or file. At 802, optionally, configure a control parameter for static search execution when the document or file is opened. At 804, optionally, configure a control parameter for dynamic search execution when the document or file is opened. At 806, the control parameter is processed for static or dynamic search execution when the document or file is opened by the author or a new user.

Following are a series of exemplary user interface (UI) employed for user interaction with search control and control parameter authoring in accordance with the disclosed architecture.

Figure 9:
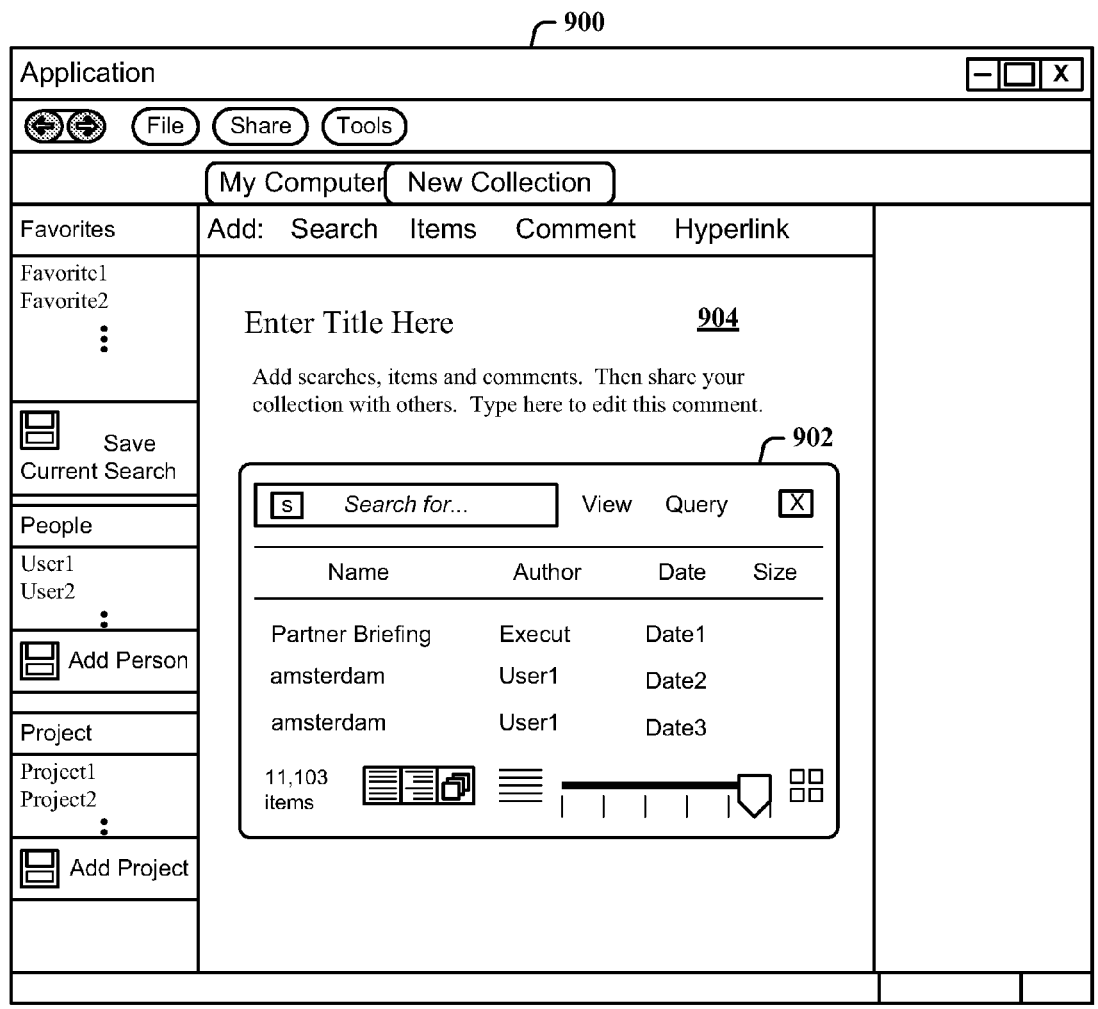
FIG. 9 illustrates an exemplary UI for adding a search control into a document or file.

FIG. 9 illustrates an exemplary UI 900 for adding a search control 902 into a document or file. A blank document template 904 is shown, and the search control 902 has already been added to the template document 904. The author can type a term, and additionally set the scope, type, view and status of the query. This information is saved, and when a different user opens the document, the query information is displayed.

Figure 10:
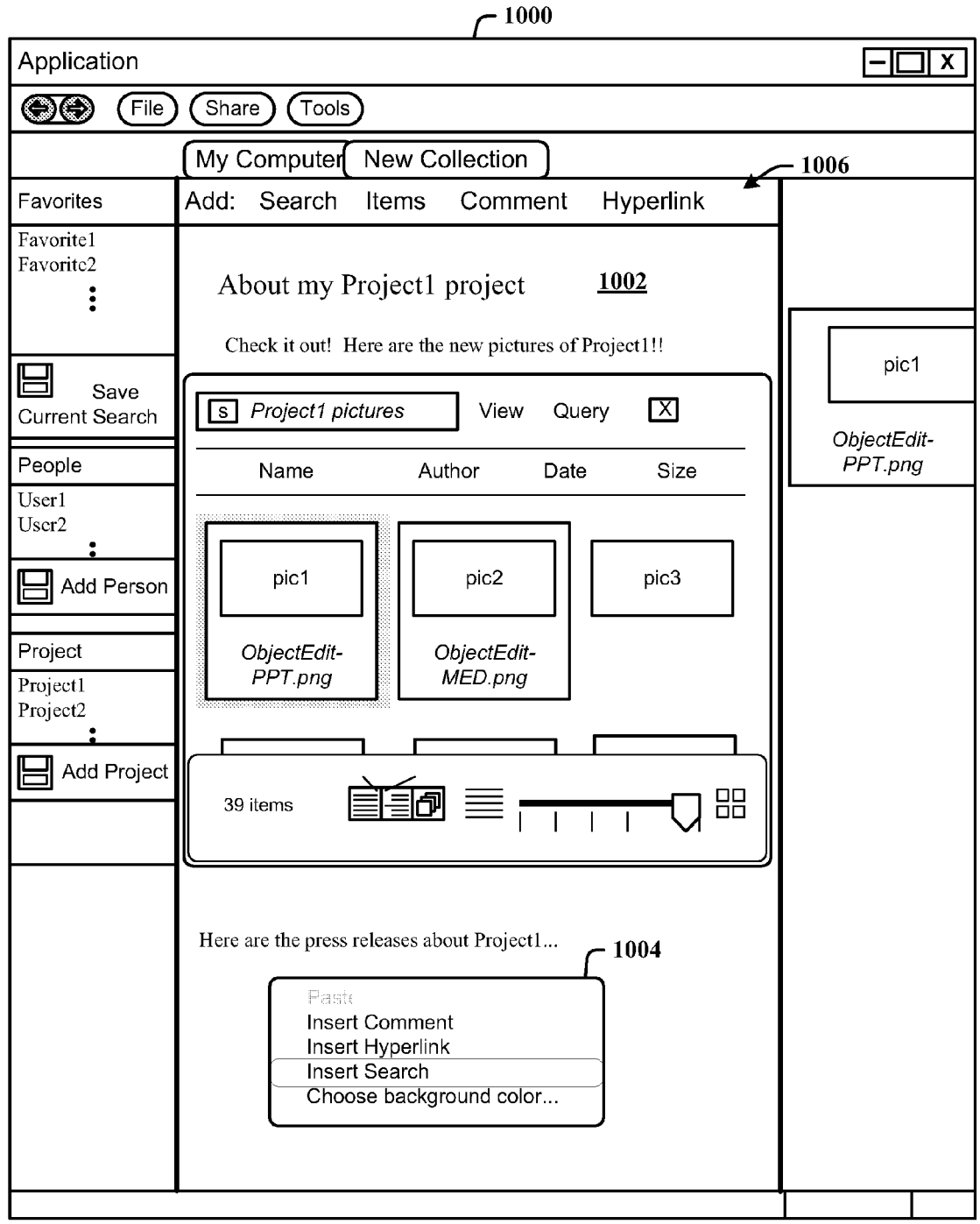
FIG. 10 illustrates an exemplary UI for adding a search into a document or file.

FIG. 10 illustrates an exemplary UI 1000 for adding a search into a document or file. There are multiple user-friendly ways in which to add a search into a document. In the document 1002, the user or author can either right click to add a search, thereby exposing a free floating menu 1004, add a new search from a toolbar 1006, or copy and paste a search from a search tool or other context such as the operating system desktop, for example.

Figure 11:
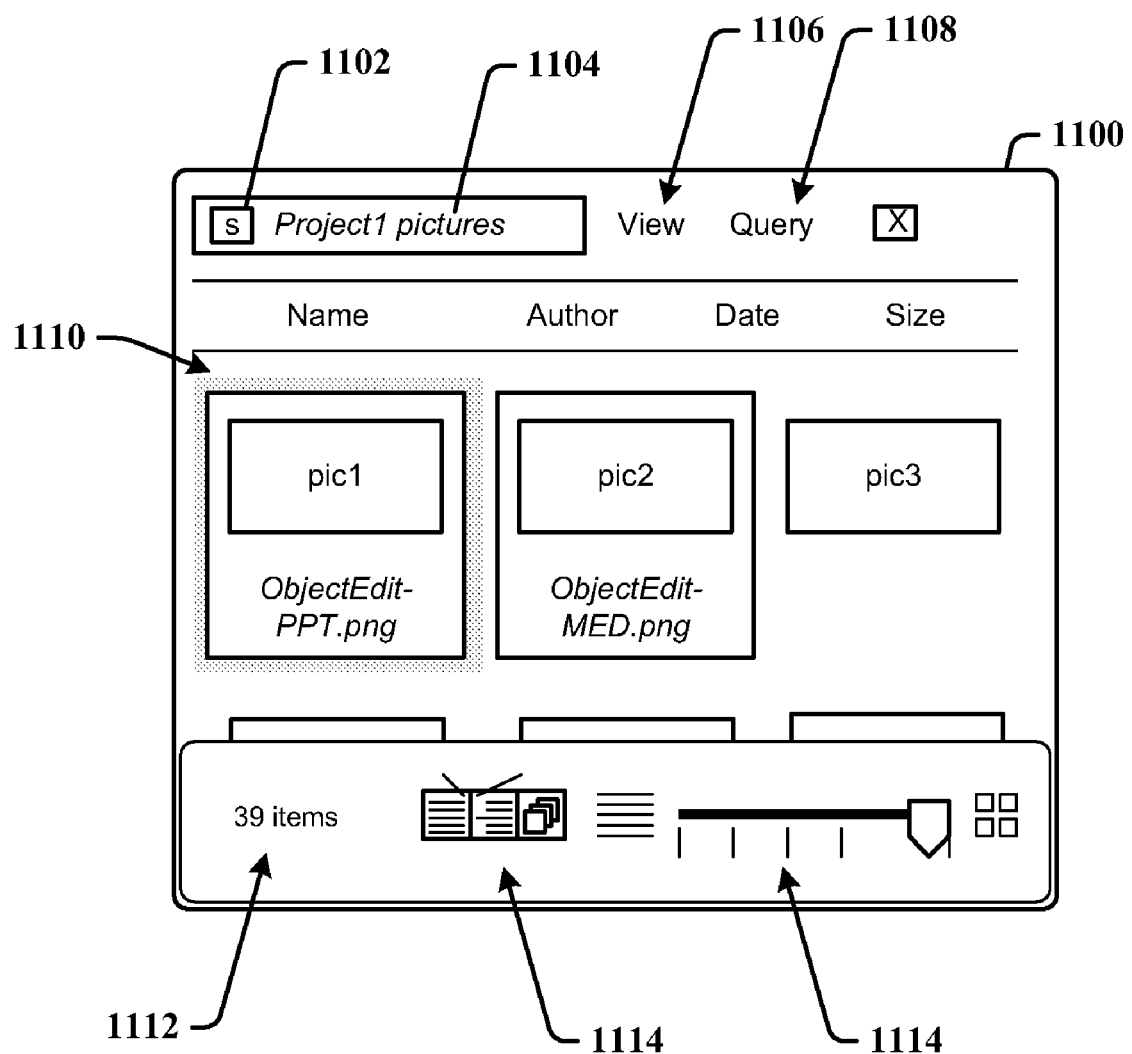
FIG. 11 illustrates basic elements of a search control.

FIG. 11 illustrates basic elements of a search control 1100. The search control 1100 can include scope selection 1102, query input 1104, viewer selection 1106, query publishing definition 1108, the view 1110, number of items 1112, view selection tools 1114, etc.

Figure 12:
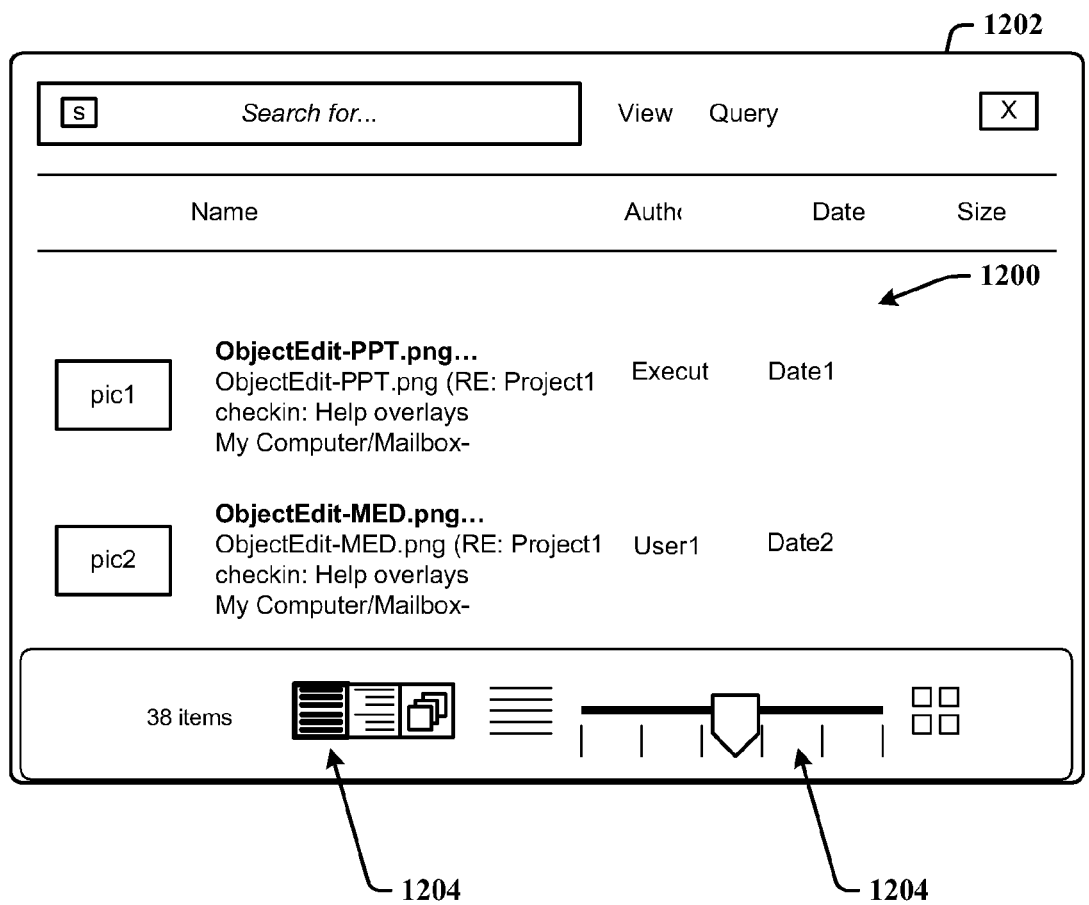
FIG. 12 illustrates an alternative view in a search control and view selection mechanisms.

FIG. 12 illustrates an alternative view 1200 in a search control 1202 and view selection mechanisms 1204. Here, the view 1200 is set to extended details. Another view could be set to thumbnail images. There are a range of views 1200 available and the author can set a default view which is shown when the document is opened. In many instances cases the user (viewer) can change the view to see the results displayed in a different way.

Figure 13:
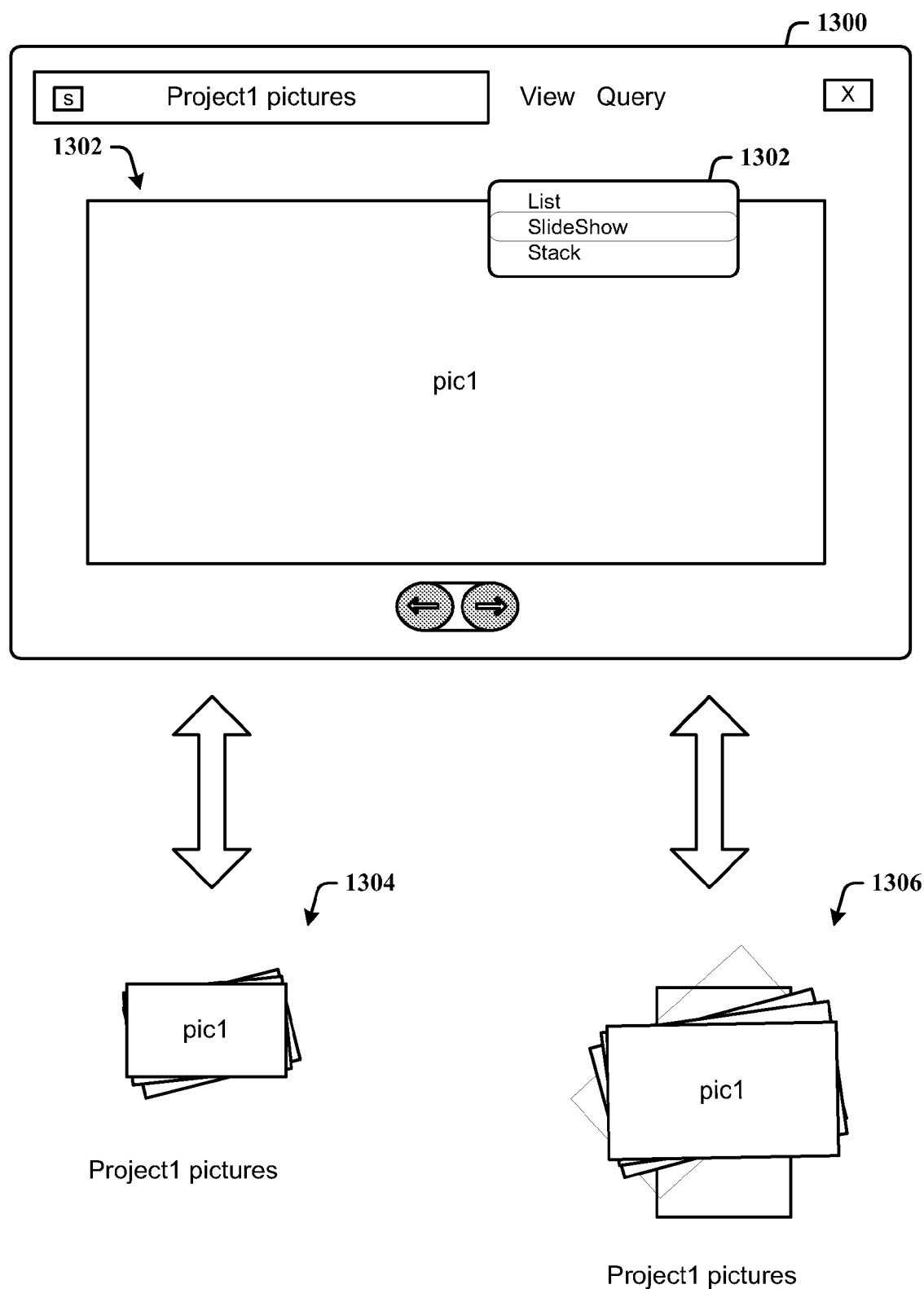
FIG. 13 illustrates other alternative views of a search control.

FIG. 13 illustrates other alternative views of a search control 1300. In addition to list view, shown in FIG. 12, the floating menu 1304 also presents selections for other alternative pluggable viewers. Examples include a slideshow 1302, a stacked (compressed view) 1304, and a timeline view 1306.

Figure 14:
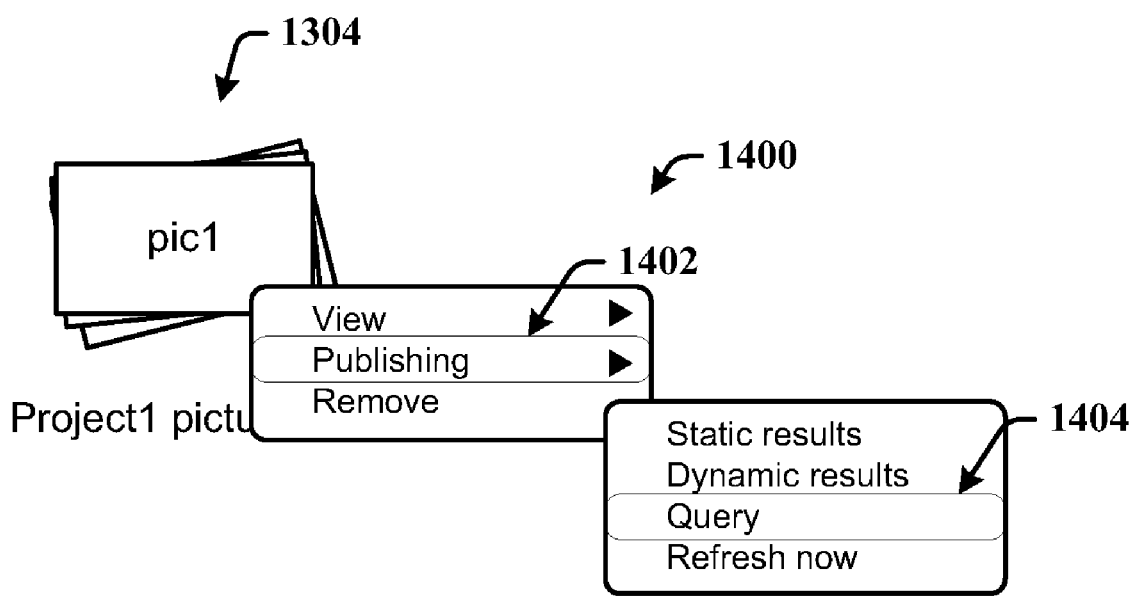
FIG. 14 illustrates that settings are accessible for the different viewers.

FIG. 14 illustrates that settings are accessible for the different viewers. For all of the different viewers, the common settings can be accessed. In this case, for the stack view 1304, the user can right-click to expose a floating menu 1400 to set the publishing settings 1402 of a query 1404.

Figure 15:
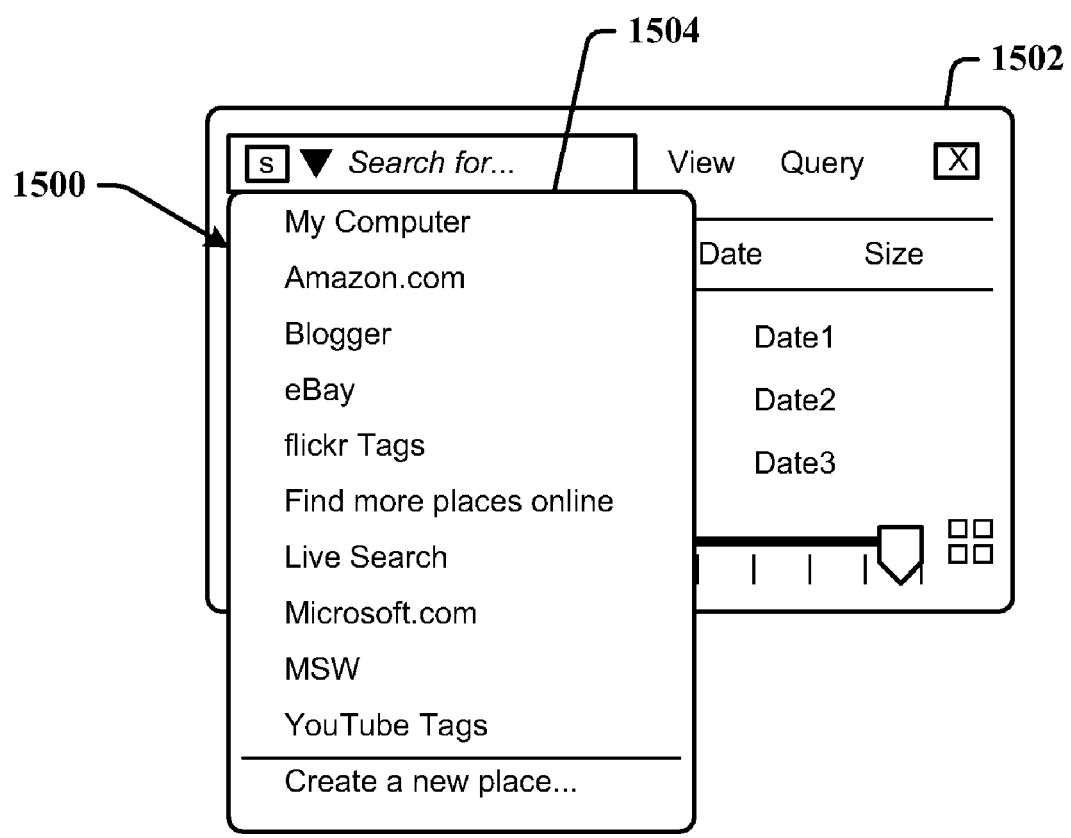
FIG. 15 illustrates the selection of one or more datasources over which the search is performed.

FIG. 15 illustrates the selection of one or more datasources over which the search is performed. Users can change and add scopes via a scope dropdown menu 1500. Associated with a search control 1502 is a default set 1504, which can include web properties (e.g., Internet search), corporate data sources (human resources info, etc.) or private data sources (files on my computer). Users can also add new data sources via a "create a new place . . . " option.

Figure 16:
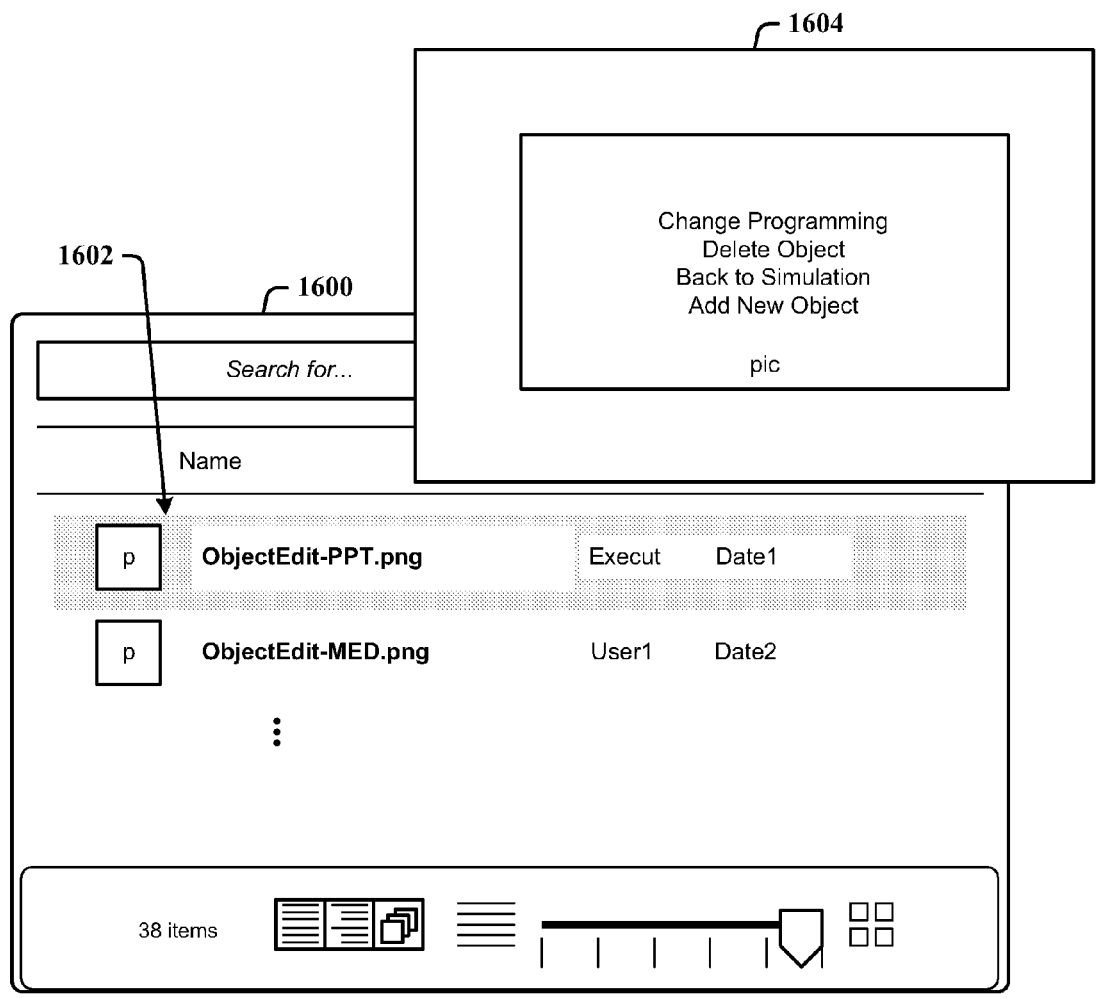
FIG. 16 illustrates functionality of a UI for exposing control and viewers via a search control.

FIG. 16 illustrates functionality of a UI for exposing control and viewers via a search control 1600. Clicking or hovering on an item 1602 in the search control 1600 (see highlighted item) can display additional items in a dedicated control such as a preview control or popup viewer. Clicking or double clicking on the item 1602 opens the item either in a separate window 1604 or in a dedicated control. The users viewing content will be notified when user permissions are inadequate for full or partial access. The user can then request access.

Figure 17:
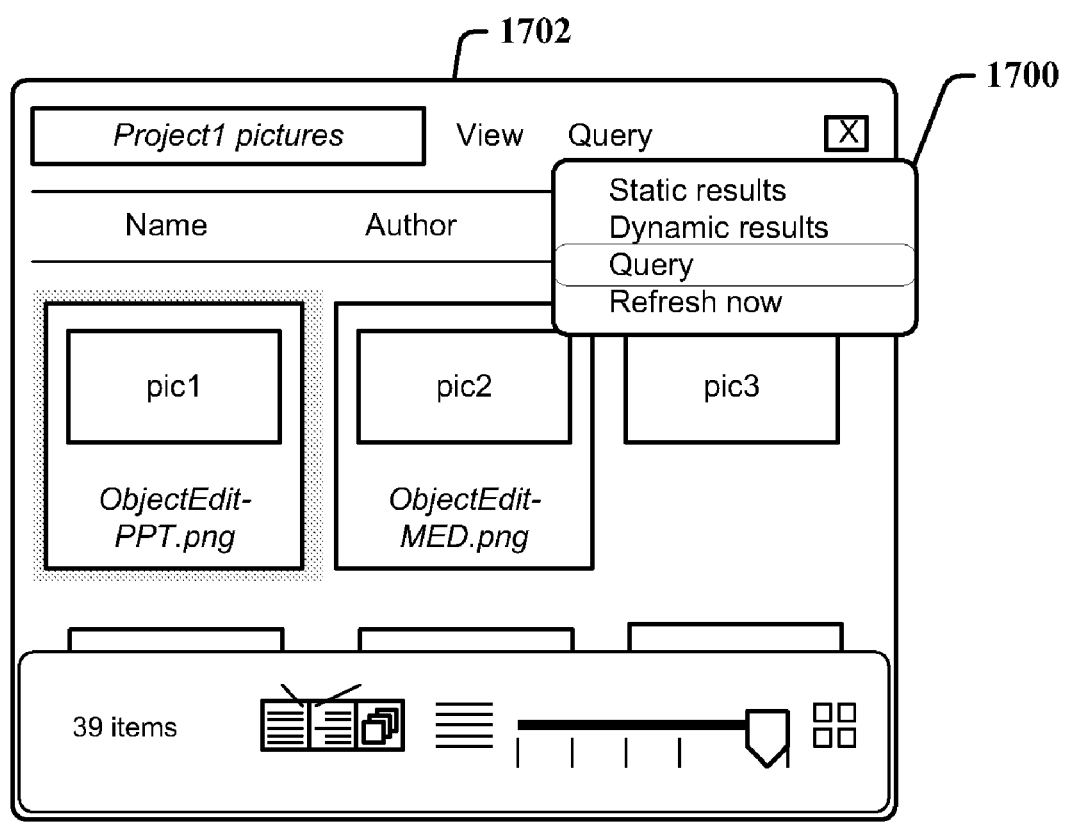
FIG. 17 illustrates a configuration for the publishing of search results.

FIG. 17 illustrates a configuration for the publishing of search results. The user can set the query publishing to be static (the set of result items does not change) or dynamic (the items change and may need to be copied to a location so others can view the items) via a menu 1700, relative to a search control 1702. The publishing state can also be set to query, which means that a live query will be executed. Different sources and different query types may have different defaults. For example, if there is a query which looks at publically accessible web data (e.g., live.com search), then the default can be "query." If the query is an email query such as "attachments from lili" this can either be a query which runs on the user's email, or a dynamic result, which allows the user to query over another user's email.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 18:
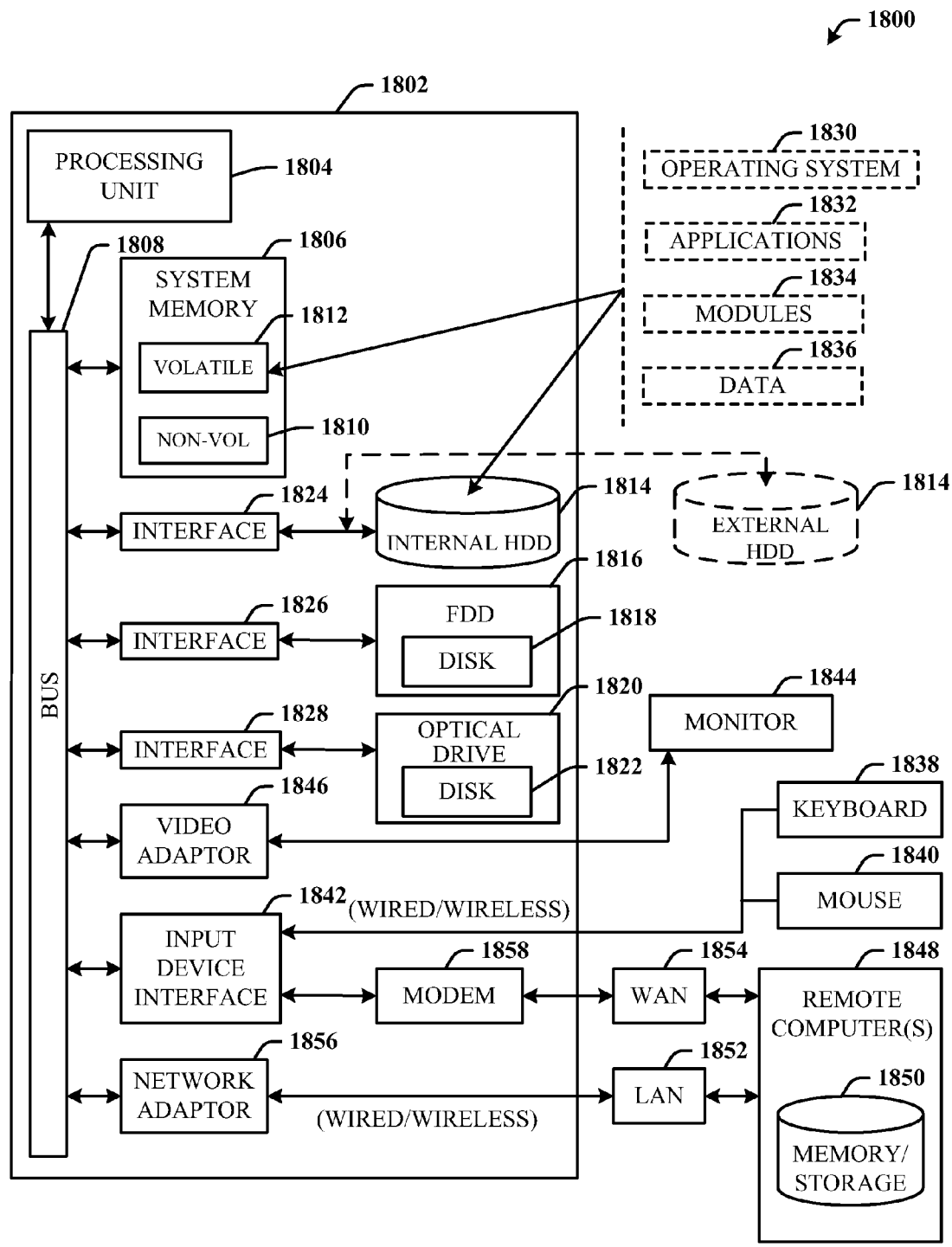
FIG. 18 illustrates a block diagram of a computing system operable to execute search control and authoring in accordance with the disclosed architecture.

Referring now to FIG. 18, there is illustrated a block diagram of a computing system 1800 operable to execute search control and authoring in accordance with the disclosed architecture. In order to provide additional context for various aspects thereof, FIG. 18 and the following discussion are intended to provide a brief, general description of a suitable computing system 1800 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 18, the exemplary computing system 1800 for implementing various aspects includes a computer 1802 having a processing unit 1804, a system memory 1806 and a system bus 1808. The system bus 1808 provides an interface for system components including, but not limited to, the system memory 1806 to the processing unit 1804. The processing unit 1804 can be any of various commercially available processors. Dual microprocessors and other multi-processor architectures may also be employed as the processing unit 1804.

The system bus 1808 can be any of several types of bus structure that may further interconnect to a memory bus (with or without a memory controller), a peripheral bus, and a local bus using any of a variety of commercially available bus architectures. The system memory 1806 can include non-volatile memory (NON-VOL) 1810 and/or volatile memory 1812 (e.g., random access memory (RAM)). A basic input/output system (BIOS) can be stored in the non-volatile memory 1810 (e.g., ROM, EPROM, EEPROM, etc.), which BIOS stores the basic routines that help to transfer information between elements within the computer 1802, such as during start-up. The volatile memory 1812 can also include a high-speed RAM such as static RAM for caching data.

The computer 1802 further includes an internal hard disk drive (HDD) 1814 (e.g., EIDE, SATA), which internal HDD 1814 may also be configured for external use in a suitable chassis, a magnetic floppy disk drive (FDD) 1816, (e.g., to read from or write to a removable diskette 1818) and an optical disk drive 1820, (e.g., reading a CD-ROM disk 1822 or, to read from or write to other high capacity optical media such as a DVD). The HDD 1814, FDD 1816 and optical disk drive 1820 can be connected to the system bus 1808 by a HDD interface 1824, an FDD interface 1826 and an optical drive interface 1828, respectively. The HDD interface 1824 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1802, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 1812, including an operating system 1830, one or more application programs 1832, other program modules 1834, and program data 1836. The one or more application programs 1832, other program modules 1834, and program data 1836 can include the authoring component 102, access component 108, search control 104, settings 110, document 106, search results 112, search controls (200 and 204), settings (202 and 206), search control 302, settings (or control parameters) 304, full or partial search results 308, share location 310, and the UIs/functionality associated with FIGS. 9-17. The datasources 114, 208, 210 and 212 can include the internal/external HDD 1814 and the remote storage 1850, for example.

All or portions of the operating system, applications, modules, and/or data can also be cached in the volatile memory 1812. It is to be appreciated that the disclosed architecture can be implemented with various commercially available operating systems or combinations of operating systems.

A user can enter commands and information into the computer 1802 through one or more wire/wireless input devices, for example, a keyboard 1838 and a pointing device, such as a mouse 1840. Other input devices (not shown) may include a microphone, an IR remote control, a joystick, a game pad, a stylus pen, touch screen, or the like. These and other input devices are often connected to the processing unit 1804 through an input device interface 1842 that is coupled to the system bus 1808, but can be connected by other interfaces such as a parallel port, IEEE 1394 serial port, a game port, a USB port, an IR interface, etc.

A monitor 1844 or other type of display device is also connected to the system bus 1808 via an interface, such as a video adaptor 1846. In addition to the monitor 1844, a computer typically includes other peripheral output devices (not shown), such as speakers, printers, etc.

The computer 1802 may operate in a networked environment using logical connections via wire and/or wireless communications to one or more remote computers, such as a remote computer(s) 1848. The remote computer(s) 1848 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1850 is illustrated. The logical connections depicted include wire/wireless connectivity to a local area network (LAN) 1852 and/or larger networks, for example, a wide area network (WAN) 1854. Such LAN and WAN networking environments are commonplace in offices and companies, and facilitate enterprise-wide computer networks, such as intranets, all of which may connect to a global communications network, for example, the Internet.

When used in a LAN networking environment, the computer 1802 is connected to the LAN 1852 through a wire and/or wireless communication network interface or adaptor 1856. The adaptor 1856 can facilitate wire and/or wireless communications to the LAN 1852, which may also include a wireless access point disposed thereon for communicating with the wireless functionality of the adaptor 1856.

When used in a WAN networking environment, the computer 1802 can include a modem 1858, or is connected to a communications server on the WAN 1854, or has other means for establishing communications over the WAN 1854, such as by way of the Internet. The modem 1858, which can be internal or external and a wire and/or wireless device, is connected to the system bus 1808 via the input device interface 1842. In a networked environment, program modules depicted relative to the computer 1802, or portions thereof, can be stored in the remote memory/storage device 1850. It will be appreciated that the network connections shown are exemplary and other means of establishing a communications link between the computers can be used.

The computer 1802 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi (or Wireless Fidelity) and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3 or Ethernet).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-readable storage medium storing computer-executable components that, when executed by a computing system, cause the computing system to perform a computer-implemented method for managing data, the computer-executable components comprising:

an authoring component for:
creating and inserting a search control window into a document that is authored by a user and that is opened and viewed in a word processing application, the search control window including a query input element for receiving a query from the user, displaying the search control window in the document to the user and configuring control parameters of the search control window that are set by the user for controlling search execution when the document is opened, the control parameters designating one or more datasources external to the document that are to be dynamically searched when the document is opened, executing a search via the search control window in the document based on a query from the user entered into the query input element and the control parameters to return search results, displaying the search results in the search control window, and saving a view of the search control window, the query from the user entered into the query input element, the control parameters, and the search results with the document when the document is saved by the user; and an access component for managing access by other users to the search control window in the document and to the control parameters of the search control window, wherein the document is configured to automatically re-execute the search via the search control window when opened by the other users, and wherein the search control is configured to display partial search results when the document is opened and viewed by a new user having a limited access permission level.

2. The computer-readable storage medium of claim 1, wherein full search results are displayed in the search control window when the document is opened and viewed by a new user having a full access permission level.

3. The computer-readable storage medium of claim 1, wherein the search control window presents alternate views based on view selection mechanisms.

4. The computer-readable storage medium of claim 1, wherein the search control window defines a default view to be presented when the document is opened and viewed.

5. The computer-readable storage medium of claim 4, wherein the search control window allows a change of view after the document is opened and viewed.

6. The computer-readable storage medium of claim 1, wherein the control parameters set by the user are edited to change a scope of the search.

7. The computer-readable storage medium of claim 6, wherein the control parameters set by the user are edited to add and change datasources to be searched.

8. The computer-readable storage medium of claim 1, wherein the access by other users to the search control window is managed by limiting access according to user-level permissions.

9. The computer-readable storage medium of claim 1, wherein the authoring component facilitates sending the saved document including the search control window to a network share location for access by the other users.

10. The computer-readable storage medium of claim 1, wherein the search control window displays thumbnail images for search results associated with automatic re-execution of the search when the document is opened.

11. A computer-implemented method of managing data associated with a document, the method comprising:
creating and inserting a search control window into a document that is authored by a user and that is opened and viewed in a word processing application, the search control window including a query input element for receiving a query from the user;
displaying the search control window in the document to the user and configuring control parameters of the search control window that are set by the user for controlling search execution when the document is opened, the control parameters designating one or more datasources external to the document that are to be dynamically searched when the document is opened;
executing a search via the search control window in the document based on a query from the user entered into the query input element and the control parameters to return search results;
displaying the search results in the search control window;
saving a view of the search control window, the query from the user entered into the query input element, the control parameters, and the search results with the document when the document is saved by the user; and
managing access by other users to the search control window in the document and to the control parameters of the search control window, wherein the document is configured to automatically re-execute the search via the search control window when opened by the other users, and wherein the search control window is configured to display partial search results when the document is opened and viewed by a new user having a limited access permission level.

12. The method of claim 11, wherein the search control window is configured to display full search results when the document is opened by a new user having a full access permission level.

13. The method of claim 11, further comprising changing a scope of the search control window to a corporate datasource or a private datasource.

14. The method of claim 11, further comprising:
configuring the control parameters for notifying a new user of inadequate permission to access the search control window in the document.

15. The method of claim 11, further comprising configuring the control parameters such that the search control window retains search results based on the status of the document.

16. The method of claim 11, further comprising configuring the control parameters such that the search control window displays thumbnail images for search results when the search is automatically re-executed when the document is opened.

17. The method of claim 11, further comprising sending the saved document including the search control window to a network share location for access by the other users.

18. The method of claim 11, further comprising exposing different views of the search control window in the document when the document is opened by a different users.

19. The method of claim 11, wherein the control parameters of the search control window comprise scope of a search, type of the search, status of the search, permission level of accessing search results, viewer selection, view, and publishing definition.

20. A computing device comprising:
a processor for executing computer-executable instructions; and
memory storing computer-executable instructions for performing a computer-implemented method of managing data associated with a document, the method comprising:
creating and inserting a search control window into a document that is authored by a user and that is opened and viewed in a word processing application, the search control window including a query input element for receiving a query from the user;
displaying the search control window in the document to the user and configuring control parameters of the search control window that are set by the user for controlling search execution when the document is opened, the control parameters designating one or more datasources external to the document that are to be dynamically searched when the document is opened;
executing a search via the search control window in the document based on a query from the user entered into the query input element and the control parameters to return search results;
displaying the search results in the search control window;
saving a view of the search control window, the query from the user entered into the query input element, the control parameters, and the search results with the document when the document is saved by the user; and
managing access by other users to the search control window in the document and to the control parameters of the search control window, wherein the document is configured to automatically re-execute the search via the search control window when opened by the other users, and the search control window is configured to display partial search results when the document is opened and viewed by a new user having a limited access permission level.

* * * * *